(12) United States Patent
Yamada et al.

(10) Patent No.: US 12,017,726 B2
(45) Date of Patent: Jun. 25, 2024

(54) SADDLE-RIDE TYPE VEHICLE

(71) Applicant: HONDA MOTOR CO., LTD., Tokyo (JP)

(72) Inventors: Masaomi Yamada, Tokyo (JP); Keita Mikura, Tokyo (JP); Kei Mayuzumi, Tokyo (JP); Takaaki Kasai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 146 days.

(21) Appl. No.: 17/800,266

(22) PCT Filed: Dec. 23, 2020

(86) PCT No.: PCT/JP2020/048283
§ 371 (c)(1),
(2) Date: Aug. 17, 2022

(87) PCT Pub. No.: WO2021/166437
PCT Pub. Date: Aug. 26, 2021

(65) Prior Publication Data
US 2023/0070716 A1    Mar. 9, 2023

(30) Foreign Application Priority Data
Feb. 21, 2020    (JP) .................................. 2020-028112

(51) Int. Cl.
*B62J 15/02* (2006.01)
*B62K 19/38* (2006.01)

(52) U.S. Cl.
CPC .............. *B62K 19/38* (2013.01); *B62J 15/02* (2013.01)

(58) Field of Classification Search
CPC .................................. B62J 15/00; B62J 15/02
See application file for complete search history.

(56) References Cited

U.S. PATENT DOCUMENTS

| 6,257,362 B1 * | 7/2001 | Scherbarth | B62J 15/02 |
| | | | 280/288.4 |
| 2014/0191006 A1 * | 7/2014 | Schanz | B62J 7/04 |
| | | | 224/413 |

(Continued)

FOREIGN PATENT DOCUMENTS

| JP | 62-101592 | 5/1987 |
| JP | H11-79031 | 3/1999 |

(Continued)

OTHER PUBLICATIONS

German Office Action corresponding to DE 112020006768.8, dated Dec. 15, 2022, 12 pages.

(Continued)

*Primary Examiner* — Erez Gurari
(74) *Attorney, Agent, or Firm* — Rankin, Hill & Clark LLP

(57) ABSTRACT

A saddle-ride type vehicle in which a fender can be attached to the fork tubes without welding on the fender, and the fender can be attached easily. The saddle-ride type vehicle includes a fender fixed to the fork tubes and covering a front wheel from above, a bracket supporting the fender from an inside of the fender, a bolt that fastens the fender to the fork tubes, a fender stay provided at the fork tubes, and an inner fixing member having a shaft shape and inserted into the bracket and the fender from the inside of the fender. The inner fixing member is fastened to the bolt inserted into the fender stay from an outside in a vehicle width direction, and the fender is held between the fender stay and the bracket on an axis of the inner fixing member by fastening force of the bolt.

9 Claims, 9 Drawing Sheets

(56) References Cited

U.S. PATENT DOCUMENTS

2019/0118889 A1* 4/2019 Koishikawa ............. B62J 11/16
2019/0210684 A1* 7/2019 Katagiri ................. B62K 25/02

FOREIGN PATENT DOCUMENTS

| JP | 2009-090892 | 4/2009 |
| JP | 2011-046247 | 3/2011 |
| JP | 2013-216234 A | 10/2013 |
| JP | 2017-165213 | 9/2017 |
| JP | 2018-131184 | 8/2018 |

OTHER PUBLICATIONS

Indian Office Action corresponding to IN 202247052681, dated Dec. 13, 2022, 6 pages.
International Search Report, International Application No. PCT/JP2020/048283, dated Feb. 9, 2021, 3 pages.
International Preliminary Report on Patentability (PCT/IPEA/409), International Application No. PCT/JP2020/048283, 8 pages.
English translation of International Preliminary Report on Patentability dated Aug. 25, 2022; Application No. PCT/JP2020/048283, (4 pages).

* cited by examiner

SADDLE-RIDE TYPE VEHICLE

TECHNICAL FIELD

The present invention relates to saddle-ride type vehicles.

BACKGROUND ART

There has been known a saddle-ride type vehicle including a pair of right and left fork tubes, a front wheel disposed between the right and left fork tubes and supported by the fork tubes, a fender fixed to the fork tubes and covering the front wheel from above, a bracket supporting the fender from an inside of the fender, and bolts fastening the fender to the fork tubes via the bracket (for example, see Patent Literature 1). In Patent Literature 1, the fender is fastened to the fork tubes with the bolts inserted into the fender from the inside to the outside of the fender in the vehicle width direction.

CITATION LIST

Patent Literature

Patent Literature 1

Japanese Patent Laid-Open No. 11-79031

SUMMARY OF INVENTION

Technical Problem

Meanwhile, in some saddle-ride type vehicles, attachment portions for attaching the fender to the fork tubes are welded to the fender. In this case, since welding marks are left on the design face of the fender, finishing work to remove the welding marks is necessary.

For example, it is conceivable that nuts for attaching the fender to the fork tubes are welded on the fender itself. In this case, the torsional force acting on the fender while the saddle-ride type vehicle is traveling is concentrated at the nut welded portions, requiring special consideration to achieve a sufficient strength.

Alternatively, as in the saddle-ride type vehicle in Patent Literature 1, it is possible to fix the fender to the fork tubes with bolts inserted into the fender from the inside of the fender. In this case, there is no need to perform welding on the fender, but since bolts are rotated inside the fender to fasten the fender, the work to remove the front wheel is necessary in some cases for attaching the fender, and this makes the work to attach the fender cumbersome.

The present invention has been made in light of the foregoing situation, an object thereof is to provide a saddle-ride type vehicle in which a fender can be attached to the fork tubes without welding on the fender, and the fender can be attached easily.

Solution to Problem

This specification includes the entire contents of Japanese Patent Application No. 2020-028112, filed on Feb. 21, 2020.

A saddle-ride type vehicle includes: a pair of right and left fork tubes (28); a front wheel (2) disposed between the right and left fork tubes (28) and supported by the fork tubes (28); a fender (45) fixed to the fork tubes (28) and covering the front wheel (2) from above; a bracket (60) supporting the fender (45) from an inside of the fender (45); and a bolt (62) that fastens the fender (45) to the fork tubes (28), the saddle-ride type vehicle further includes: a fender stay (55) provided at the fork tubes (28); and an inner fixing member (61) having a shaft shape and inserted into the bracket (60) and the fender (45) from the inside of the fender (45), the inner fixing member (61) is fastened to the bolt (62) inserted into the fender stay (55) from an outside in a vehicle width direction, and the fender (45) is held between the fender stay (55) and the bracket (60) on an axis of the inner fixing member (61) by fastening force of the bolt (62).

In the above configuration, the inner fixing member (61) may include a shaft-shaped portion (68) that is inserted into the bracket (60) and the fender (45) from the inside of the fender (45), and a flange portion (69) that is in contact with the bracket (60) from an inside in the vehicle width direction and prevents the inner fixing member (61) from coming out.

In the above configuration, the shaft-shaped portion (68) may protrude from the fender (45) outward in the vehicle width direction, and an inner periphery of the shaft-shaped portion (68) may have a female threaded portion (70) into which the bolt (62) is fastened, the fender stay (55) may include a hole portion (88) to which the bolt (62) is inserted from the outside in the vehicle width direction, and the shaft-shaped portion (68) may be fitted into the hole portion (88).

In the above configuration, the inner fixing member (61) may be inserted into an attachment hole (64a) formed in the bracket (60) from an inside in the vehicle width direction and may be prevented from rotating relative to the attachment hole (64a).

In the above configuration, the attachment hole (64a) may be an irregular-shaped hole instead of a perfect circle hole, and the inner fixing member (61) may be prevented from rotating by engaging with the irregular-shaped hole.

In the above configuration, the fender stay (55) may include a first divided portion (91) and a second divided portion (92) combined and fastened to each other to form an annular shape that fits to an outer periphery of the fork tubes (28), and the first divided portion (91) and the second divided portion (92) may be fastened with the bolt (62).

In the above configuration, the fender stay (55) may have an annular shape that fits to an outer periphery of the fork tubes (28), and the fender stay (55) may have a recess (85a) or a protrusion provided in an inner peripheral portion of the fender stay (55), and the recess (85a) or the protrusion may engage with the outer periphery of the fork tubes (28).

In the above configuration, the fender stay (55) may be provided at each of the right and left fork tubes (28), and the bracket (60) may include a pair of right and left fender fastening portions (64) that are respectively fastened to the right and left fender stays (55) and a connecting portion (65) connecting the right and left fender fastening portions (64) in a right-left direction.

In the above configuration, the fender stay (55) may include a pair of front and rear fixing portions (86, 87) on both sides of the fork tubes (28), the fixing portions (86, 87) holding the fender (45) between the bracket (60) and the fender stay (55), and a material reduction recess (89) away from the fender (45) outward in the vehicle width direction may be formed between the front and rear fixing portions (86, 87).

In the above configuration, the fender stay (55) may include a pipe fixing portion (93) to which a brake pipe (53) is fixed.

In the above configuration, the brake pipe (53) may include a rotation restriction portion (53b) that comes into contact with the fender stay (55) to restrict rotation of the brake pipe (53).

Advantageous Effects of Invention

A saddle-ride type vehicle includes: a pair of right and left fork tubes; a front wheel disposed between the right and left fork tubes and supported by the fork tubes; a fender fixed to the fork tubes and covering the front wheel from above; a bracket supporting the fender from an inside of the fender; and a bolt that fastens the fender to the fork tubes, the saddle-ride type vehicle further includes: a fender stay provided at the fork tubes; and an inner fixing member having a shaft shape and inserted into the bracket and the fender from the inside of the fender, the inner fixing member is fastened to the bolt inserted into the fender stay from an outside in a vehicle width direction, and the fender is held between the fender stay and the bracket on an axis of the inner fixing member by fastening force of the bolt.

With this configuration, since the fender can be fixed by fastening the bolt and the inner fixing member, it is possible to attach the fender to the fork tubes without welding on the fender. Since the fender can be fixed with the bolt that is inserted from the outside in the vehicle width direction, it is unlikely that the front wheel needs to be removed, and it is easy to attach the fender.

In the above configuration, the inner fixing member may include a shaft-shaped portion that is inserted into the bracket and the fender from the inside of the fender, and a flange portion that is in contact with the bracket from an inside in the vehicle width direction and prevents the inner fixing member from coming out.

With this configuration, since the inner fixing member is prevented from coming out by the flange portion, it is possible to hold the fender between the fender stay and the bracket by the fastening force of the bolt. Since the inner fixing member can be positioned at an appropriate position with the flange portion in attachment work, the attachment work is easy.

In the above configuration, the shaft-shaped portion may protrude from the fender outward in the vehicle width direction, and an inner periphery of the shaft-shaped portion may have a female threaded portion to which the bolt is fastened, the fender stay may include a hole portion into which the bolt is inserted from the outside in the vehicle width direction, and the shaft-shaped portion may be fitted into the hole portion.

With this configuration, since the shaft-shaped portion of the inner fixing member protrudes from the fender outward in the vehicle width direction, it is possible in attachment work to set the inner fixing member in a state in which the inner fixing member is inserted into the bracket and the fender. Thus, it is possible to prevent the inner fixing member from falling off the fender in attachment work, and the workability is favorable.

In addition, since the shaft-shaped portion of the inner fixing member is fitted into the hole portion of the fender stay, it is possible to position the fender stay at an appropriate position, and the workability is favorable. Further, since the length of the female threaded portion can be long, it is possible to appropriately fasten the bolt and the inner fixing member.

In the above configuration, the inner fixing member may be inserted into an attachment hole formed in the bracket from an inside in the vehicle width direction and may be prevented from rotating relative to the attachment hole.

With this configuration, since the inner fixing member is prevented from rotating relative to the attachment hole, it is possible to prevent the inner fixing member from rotating together when the bolt is fastened, and thus, the attachment work is easy.

In the above configuration, the attachment hole may be an irregular-shaped hole instead of a perfect circle hole, and the inner fixing member may be prevented from rotating by engaging with the irregular-shaped hole.

With this configuration, it is possible to prevent the inner fixing member from rotating with a simple structure using an irregular-shaped hole.

In the above configuration, the fender stay may include a first divided portion and a second divided portion combined and fastened to each other to form an annular shape that fits to an outer periphery of the fork tubes, and the first divided portion and the second divided portion may be fastened with the bolt.

With this configuration, since the fender stay is divided, it is easy to attach the fender stay to the fork tubes. Since the fender stay can be attached by utilizing the bolt for fixing the fender, it is possible to reduce the part count.

In the above configuration, the fender stay may have an annular shape that fits to an outer periphery of the fork tubes, and the fender stay may have a recess or a protrusion provided in an inner peripheral portion of the fender stay, and the recess or the protrusion may engage with the outer periphery of the fork tubes.

With this configuration, it is possible to position the fender stay relative to the fork tubes by using the recess or the protrusion of the fender stay.

In the above configuration, the fender stay may be provided at each of the right and left fork tubes, and the bracket may include a pair of right and left fender fastening portions that are respectively fastened to the right and left fender stays and a connecting portion connecting the right and left fender fastening portions in a right-left direction.

With this configuration, the right and left fender stays are connected via the bracket in the right-left direction, it is possible to support the fender with a high stiffness by using the right and left fender stays and the bracket.

In the above configuration, the fender stay may include a pair of front and rear fixing portions on both sides of the fork tubes, the fixing portions holding the fender between the bracket and the fender stay, and a material reduction recess away from the fender outward in the vehicle width direction may be formed between the front and rear fixing portions.

With this configuration, it is possible to reduce the weight of the fender stay by forming the material reduction recess.

In the above configuration, the fender stay may include a pipe fixing portion to which a brake pipe is fixed.

With this configuration, it is possible to fix the brake pipe with a simple structure utilizing the fender stay.

In the above configuration, the brake pipe may include a rotation restriction portion that comes into contact with the fender stay to restrict rotation of the brake pipe.

With this configuration, it is possible to restrict the rotation of the brake pipe with a simple structure.

DESCRIPTION OF EMBODIMENTS

Hereinafter, an embodiment of the present invention will be described with reference to the drawings. Note that the directions mentioned in the description such as front-rear, right-left, and upper-lower are the same as the directions with respect to the vehicle body, unless otherwise specified. In each drawing, the symbol FR indicates the front direction relative to the vehicle body, the symbol UP indicates the upward direction relative to the vehicle body, and the symbol RH indicates the right direction relative to the vehicle body.

Figure 1:
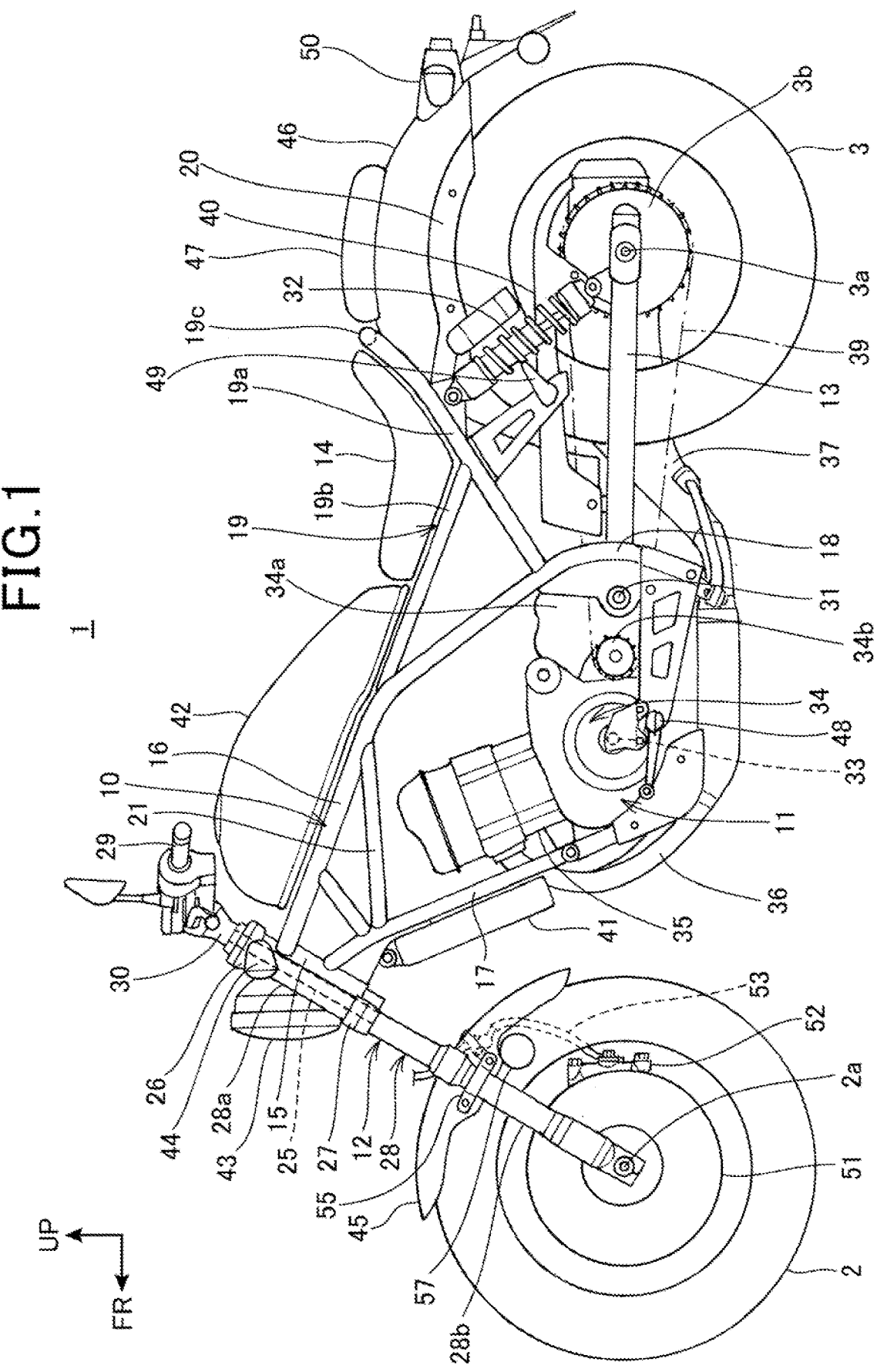
FIG. 1 is a left side view of a motorcycle according to an embodiment of the present invention.

FIG. 1 is a left side view of a motorcycle 1 according to the embodiment of the present invention.

The motorcycle 1 is a vehicle in which an engine 11 serving as a power unit is supported by a vehicle body frame 10, a front fork 12 that steerably supports a front wheel 2 is steerably supported by the front end of the vehicle body frame 10, and a swing arm 13 supporting a rear wheel 3 is provided at the rear side of the vehicle body frame 10.

The motorcycle 1 is a saddle-ride type vehicle which the occupant (driver) sits astride, sitting on a seat 14, and the seat 14 is provided above a rear portion of the vehicle body frame 10.

The vehicle body frame 10 includes a head pipe 15 provided at the front end of the vehicle body frame 10, a pair of right and left main frames 16 extending rearward and downward from the head pipe 15, a pair of right and left down frames 17 extending rearward and downward from a portion of the head pipe 15 on the lower side of the main frames 16, a pair of right and left pivot frames 18 extending downward from the rear end of the main frames 16, a seat frame 19 extending rearward from rear portions of the main frames 16 and upper portions of the pivot frames 18, and a rear frame 20 extending from rear portions of the seat frame 19 to a rear end portion of the motorcycle 1.

In addition, the vehicle body frame 10 includes a pair of right and left reinforcement frames 21 connecting upper portions of the down frames 17 and upper portions of the main frames 16.

Specifically, the seat frame 19 includes a pair of right and left lower seat rails 19a extending rearward and upward from the right and left pivot frames 18, a pair of right and left upper seat rails 19b extending rearward and downward from the rear end portions of the right and left main frames 16 and then connected to intermediate portions in the front-rear direction of the lower seat rails 19a, and a right-left connection portion 19c connecting the rear ends of the right and left lower seat rails 19a in the vehicle width direction (right-left direction).

The rear frame 20 extends rearward from rear portions of the lower seat rails 19a.

The front fork 12 includes a steering shaft 25 rotatably supported by the head pipe 15, a top bridge 26 fixed at the upper end of the steering shaft 25, a bottom bridge 27 fixed at the lower end of the steering shaft 25, and a pair of right and left fork tubes 28 supported by the top bridge 26 and the bottom bridge 27.

The fork tubes 28 are telescopic suspensions. The fork tubes 28 include fixed tubes 28a fixed to the top bridge 26 and the bottom bridge 27 and movable tubes 28b fitted into the lower portions of the respective fixed tubes 28a and capable of axially reciprocating relative to the fixed tubes 28a.

The top bridge 26 extends from the steering shaft 25 in the vehicle width direction above the head pipe 15 and connects upper end portions of the right and left fixed tubes 28a.

The bottom bridge 27 extends from the steering shaft 25 in the vehicle width direction below the head pipe 15 and connects the right and left fixed tubes 28a.

The fork tubes 28 are disposed so as to be inclined rearward in vehicle side view. The front wheel 2 is rotatably supported by an axle 2a disposed between lower end portions of the right and left movable tubes 28b and is located between the right and left movable tubes 28b.

The handle 29 for the occupant to steer the front fork 12 to the right and left is attached to the top bridge 26 via a handle post 30.

The swing arm 13 is pivotally supported by a pivot shaft 31 supported by the right and left pivot frames 18. The pivot shaft 31 extends horizontally in the vehicle width direction. A front end portion of the swing arm 13 is pivotally supported by the pivot shaft 31 and swings up and down around the pivot shaft 31.

The rear wheel 3 is rotatably supported by an axle 3a provided at a rear end portion of the swing arm 13.

The motorcycle 1 includes a pair of right and left rear suspensions 32 disposed between rear end portions of the swing arm 13 and the seat frame 19.

The engine 11 is disposed below the main frames 16 and between the down frames 17 and the pivot frames 18 in the vehicle front-rear direction and fixed to the vehicle body frame 10.

The engine 11 includes a crank case 34 supporting a crank shaft 33 extending horizontally in the vehicle width direction (right-left direction) and a cylinder portion 35 storing a piston (not illustrated) that reciprocates. The cylinder portion 35 extends upward from the upper face of a front portion of the crank case 34.

An exhaust device of the engine 11 includes an exhaust pipe 36 connected to an exhaust port in the front face of the cylinder portion 35 and a muffler 37 connected to the downstream end of the exhaust pipe 36.

The rear portion of the crank case 34 is a transmission case portion 34a storing a transmission. An output shaft (not illustrated) of the transmission protrudes outward in the vehicle width direction from the transmission case portion 34a, and the output shaft is provided with a drive sprocket 34b. The drive sprocket 34b is covered with a sprocket cover 38.

The output of the engine 11 is transmitted to the rear wheel 3 through a drive-power transmission member 39 connecting the drive sprocket 34b and a driven sprocket 3b of the rear wheel 3. In this case, the drive-power transmission member 39 is an endless chain disposed between the drive sprocket 34b and the driven sprocket 3b so as to be wound on them, but the drive-power transmission member 39 may be, for example, an endless belt.

A cover member 40 covering the drive-power transmission member 39 is attached to the swing arm 13.

A radiator 41 through which cooling water for the engine 11 passes is disposed below the head pipe 15 and on the front side of the engine 11.

A fuel tank 42 is disposed above the main frames 16 and between the head pipe 15 and the seat 14.

A head light 43 is provided on the front side of the head pipe 15. Turn signals 44 are attached to upper portion of the fork tubes 28.

A front fender 45 (fender) that covers the front wheel 2 from above is supported by the fork tubes 28.

A rear fender 46 that covers the rear wheel 3 from above is supported by the rear frame 20. The rear fender 46 is disposed on the rear side of the seat 14.

The motorcycle 1 includes a rear seat 47 on which a passenger sits, on the rear side of the seat 14. The rear seat 47 is disposed above the rear fender 46.

A pair of right and left steps 48 on which the occupant sitting on the seat 14 puts his/her feet are disposed on the front side of the right and left pivot frames 18. Pillion steps 49 on which the passenger sitting on the rear seat 47 puts his/her feet are disposed on the front lower side of the rear seat 47.

A tail-light unit 50 is attached to a rear end portion of the rear fender 46.

Figure 2:
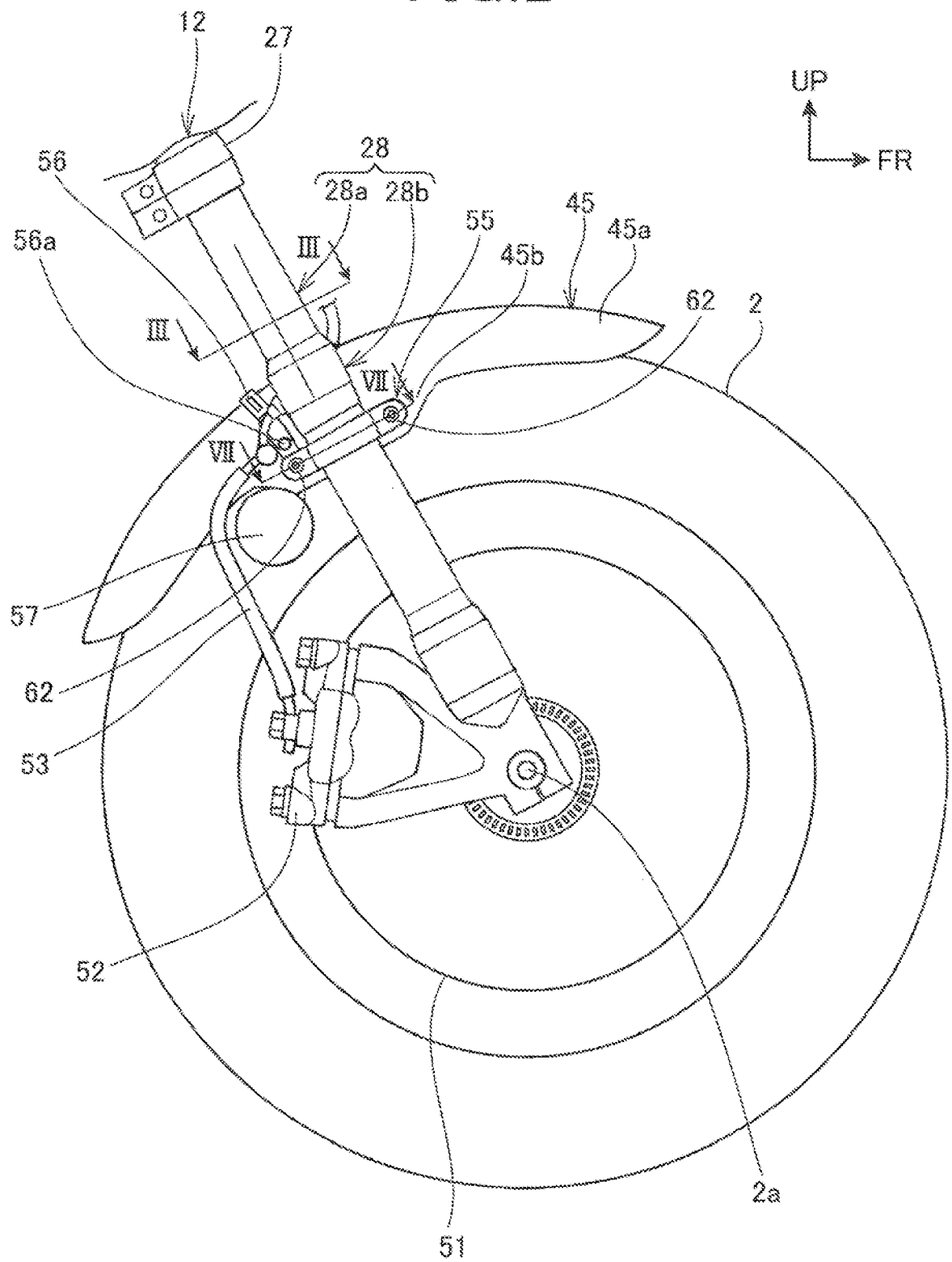
FIG. 2 is a right side view of a front wheel and its surroundings.
Figure 3:
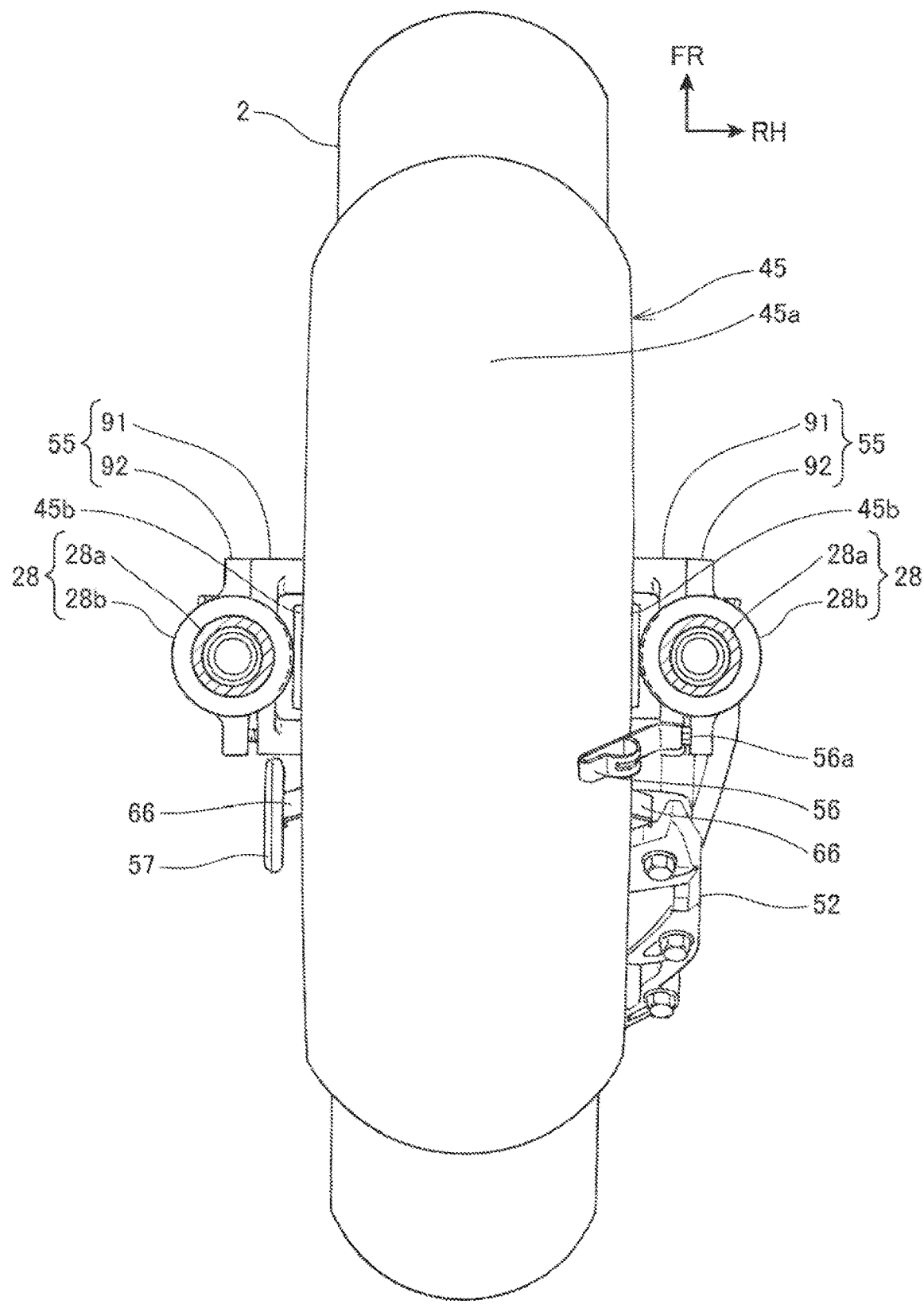
FIG. 3 is a cross-sectional view taken along line III-III in FIG. 2.

FIG. 2 is a right side view of the front wheel 2 and its surroundings. FIG. 3 is a cross-sectional view taken along line III-III in FIG. 2.

A braking device that brakes the front wheel 2 includes a brake disk 51 that rotates together with the front wheel 2, a brake caliper 52 that clamps the brake disk 51 to brake the front wheel 2 with the friction, a brake pipe 53 extending upward from the brake caliper 52, and a liquid-pressure generation device (not illustrated) that applies the liquid pressure for braking the front wheel 2 to the brake caliper 52 via the brake pipe 53.

The brake disk 51 is fixed on one side (right side) of the right and left sides of the front wheel 2. The brake caliper 52 is fixed to the rear face of a lower end portion of the movable tube 28b of one (the right one) of the right and left fork tubes 28.

The right and left fork tubes 28 are each provided with a fender stay 55 that supports the front fender 45. The pair of right and left fender stays 55 are attached to upper portions of the right and left movable tubes 28b.

The front fender 45 includes a fender upper-face portion 45a covering the upper face of the front wheel 2 from above and a pair of right and left fender side-face portions 45b extending downward from the right and left side edges of the fender upper-face portion 45a.

The fender upper-face portion 45a is an arc-shaped plate portion extending along the outer periphery of the front wheel 2 in vehicle side view. The fender upper-face portion 45a is curved in an arc shape along the profile of the outer periphery of the front wheel 2 such that the center portion in the vehicle width direction is highest, when viewed in the vehicle front-rear direction.

The fender side-face portions 45b are plate portions covering the front wheel 2 from the outside in the vehicle width direction. The fender side-face portions 45b are provided at intermediate portions in the front-rear direction of the front fender 45 and overlap with upper portions of the movable tubes 28b from the inside in the vehicle width direction in vehicle side view.

A stay 56 extending upward is attached to the right fender stay 55.

A pair of right and left reflection plates 57 that reflect light in the side directions are provided on the rear sides of the fork tubes 28 and below the front fender 45. Note that in FIG. 3, the right reflection plate 57 is not illustrated.

Figure 4:
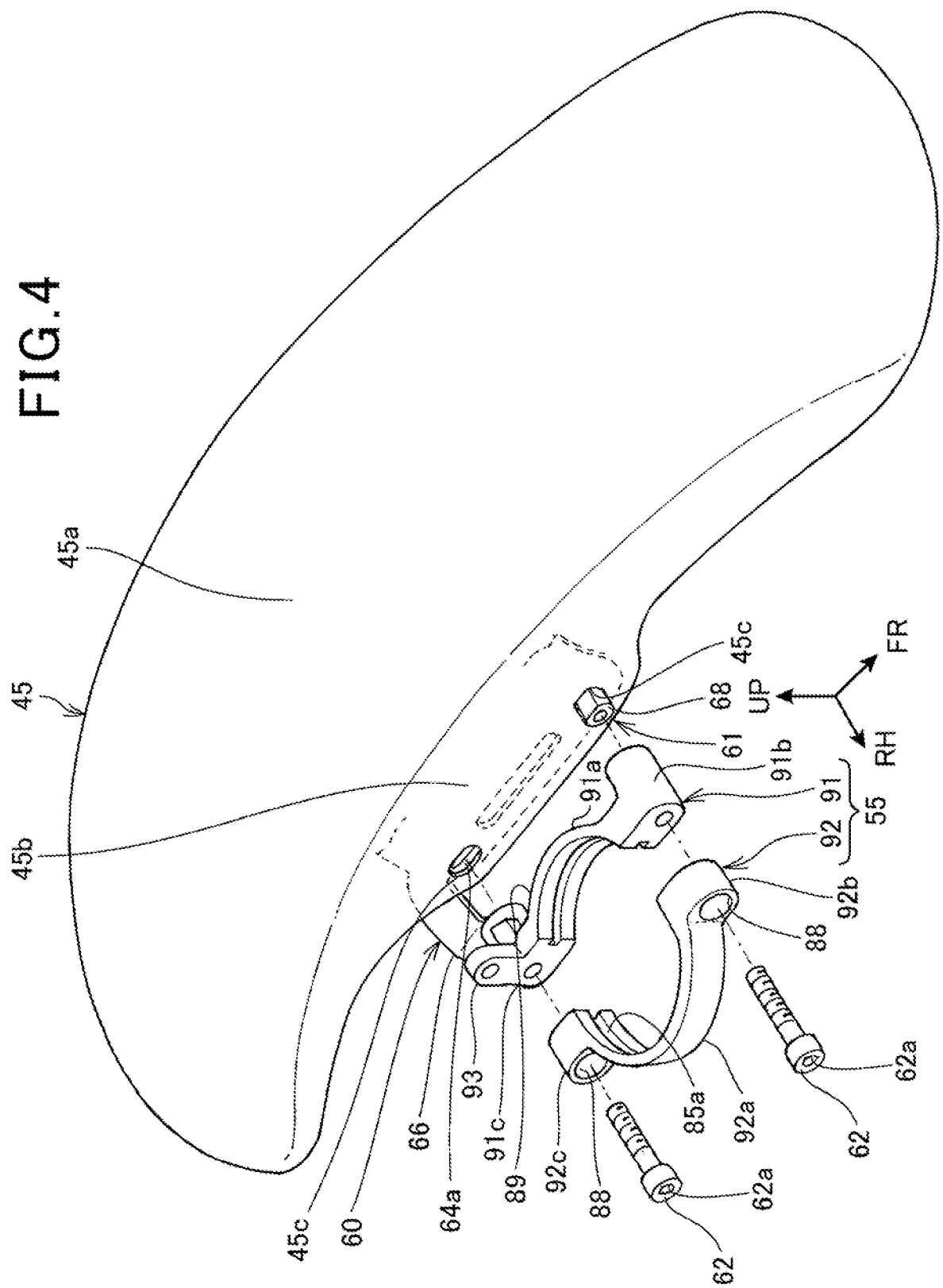
FIG. 4 is a perspective view of the structure for attaching a front fender, seen from above the front fender.
Figure 5:
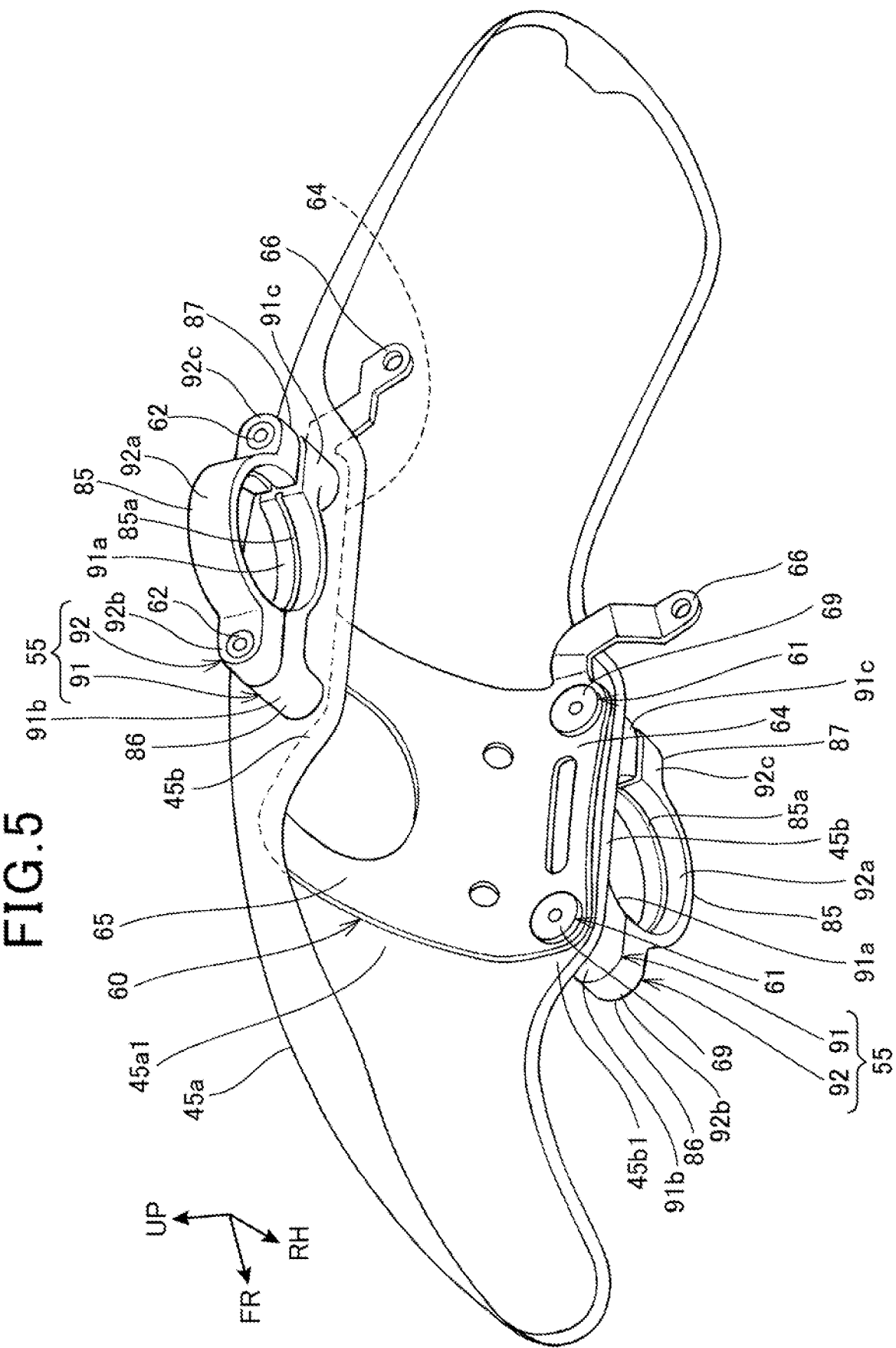
FIG. 5 is a perspective view of the structure for attaching the front fender, seen from below the front fender.
Figure 6:
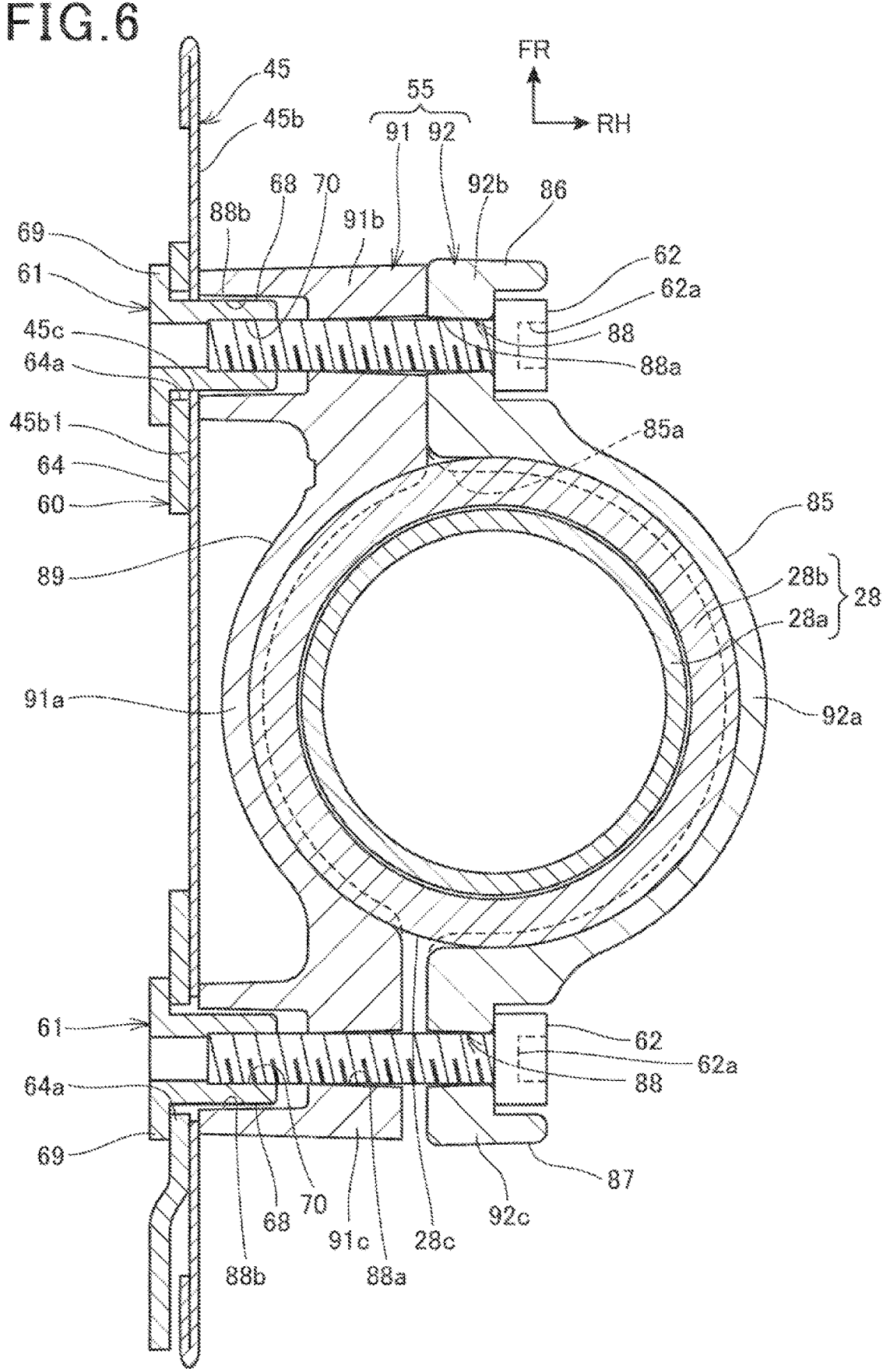
FIG. 6 is a cross-sectional view taken along line VI-VI in FIG. 2.

FIG. 4 is a perspective view of the structure for attaching the front fender 45, seen from above the front fender 45. FIG. 5 is a perspective view of the structure for attaching the front fender 45, seen from below the front fender 45. FIG. 6 is a cross-sectional view taken along line VI-VI in FIG. 2. Here, in FIG. 4, the left fender stay 55 is not illustrated.

Since the structure for attaching the front fender 45 is approximately bilaterally symmetrical, the right side attachment structure will be mainly described here in detail.

With reference to FIGS. 3 to 6, the structure for attaching the front fender 45 includes the right and left fender stays 55, a bracket 60 supporting the front fender 45 from the inside of the front fender 45, inner fixing members 61 inserted into the bracket 60 and the front fender 45 from the insides of the front fender 45, and bolts 62 for fastening the front fender 45 to the fork tubes 28. Here, the inside of the front fender 45 means the back face side of the front fender 45.

The bracket 60 is a plate member provided along the back face of the front fender 45.

The bracket 60 includes a pair of right and left fender fastening portions 64 in contact with the inner surfaces 45b1 of the fender side-face portions 45b and a connecting portion 65 connecting the right and left fender fastening portions 64 in the right-left direction.

The connecting portion 65 connects the upper edges of the fender fastening portions 64 in the right-left direction and is in contact with the inner surface 45a1 of the fender upper-face portion 45a. The bracket 60 supports the front fender 45 from the inside by being in contact with the inner surfaces 45b1 and the inner surface 45a1 of the front fender 45.

Each of the fender fastening portions 64 of the bracket 60 has a pair of attachment holes 64a provided side by side in the front-rear direction and passing through the fender fastening portion 64 in the vehicle width direction.

The fender side-face portion 45b of the front fender 45 has a pair of fixation holes 45c arranged side by side in the front-rear direction and passing through the fender side-face portion 45b in the vehicle width direction. The attachment holes 64a of the bracket 60 overlap with the fixation holes 45c of the fender side-face portion 45b from the inside in the vehicle width direction.

The bracket 60 includes a pair of right and left reflection-plate stays 66 extending rearward and downward from the fender fastening portions 64. The reflection plate 57 is supported by the reflection-plate stay 66.

The inner fixing member 61 has a shaft shape that is inserted into the attachment hole 64a of the bracket 60 and the fixation hole 45c of the fender side-face portion 45b from the inside of the front fender 45. Although the inner fixing members 61 are provided in a pair corresponding to the front and rear attachment holes 64a, in FIG. 4, the inner fixing member 61 on the rear side is not illustrated.

Specifically, the inner fixing member 61 includes a shaft-shaped portion 68 that is inserted into the attachment hole 64a and the fixation hole 45c from the inside of the front fender 45 and an annular flange portion 69 extending radially outward from the inner end in the vehicle width direction of the shaft-shaped portion 68.

The shaft-shaped portion 68 is tubular, and the inner periphery of the shaft-shaped portion 68 has a female threaded portion 70 to which a bolt 62 is fastened. In other words, the inner fixing member 61 is a nut into which a bolt 62 is screwed. The flange portion 69 has a larger diameter than the attachment hole 64a.

For the inner fixing member 61, the shaft-shaped portion 68 is inserted into the attachment hole 64a and the fixation hole 45c from the inside in the vehicle width direction, and the flange portion 69 comes into contact with the fender fastening portion 64 of the bracket 60 from the inside in the vehicle width direction so that the inner fixing member 61 will not come out to the outside in the vehicle width direction.

In the state in which the flange portion 69 of the inner fixing member 61 is in contact with the fender fastening portion 64, the shaft-shaped portion 68 protrudes outward in the vehicle width direction from the fender side-face portion 45b.

Figure 7:
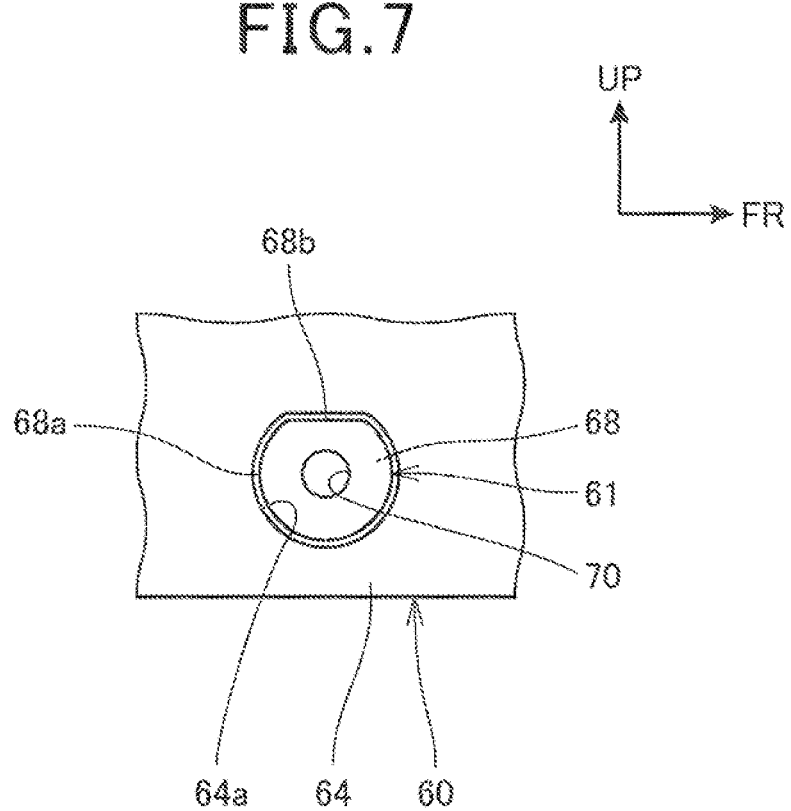
FIG. 7 is a side view of an inner fixing member inserted into an attachment hole of a bracket, seen from the outside in the vehicle width direction.

FIG. 7 is a side view of the inner fixing member 61 inserted into the attachment hole 64a of the bracket 60, seen from the outside in the vehicle width direction.

As illustrated in FIG. 7, the attachment hole 64a of the fender fastening portion 64 of the bracket 60 is an irregular-shaped hole instead of a perfect circle hole. The attachment hole 64a is an irregular-shaped hole formed as if part of a perfect circle hole is filled, for example, an approximately D-shaped hole. The attachment hole 64a includes an arc portion having an arc shape and a straight-line portion connecting both ends of the arc portion.

The shaft-shaped portion 68 of the inner fixing member 61 configured to be inserted into the attachment hole 64a is a shaft having an outer shape analogous to the attachment hole 64a and a smaller diameter than the attachment hole 64a and has an outer periphery with an irregular shape that is a perfect circle with part of it cut off, in axial view. The shape of the shaft-shaped portion 68 in axial view is approximately D-shaped, as an example.

The outer periphery of the shaft-shaped portion 68 includes, in axial view, an arc portion 68a having an arc shape and a straight-line portion 68b connecting both ends of the arc portion 68a.

Since the shaft-shaped portion 68 of the inner fixing member 61 engages with the attachment hole 64a having the irregular-shaped hole, the rotation of the inner fixing member 61 on the shaft-shaped portion 68 is restricted. When a force in the rotation direction acts on the inner fixing member 61, the straight-line portion 68b comes into contact with the inner periphery of the attachment hole 64a, and thereby the inner fixing member 61 is prevented from rotating.

With reference to FIGS. 4 to 6, the fender stay 55 includes an annular portion 85 fitted to the outer periphery of the movable tube 28b, a front fixing portion 86 (fixing portion) protruding forward from a front end portion of the annular portion 85, and a rear fixing portion 87 (fixing portion) protruding rearward from a rear end portion of the annular portion 85.

The front fixing portion 86 and the rear fixing portion 87 each have a hole portion 88 into which the bolt 62 is inserted from the outside in the vehicle width direction.

The fender stay 55 is formed by combining a first divided portion 91 disposed on the inside of the movable tube 28b in the vehicle width direction and a second divided portion 92 on the outside of the movable tube 28b in the vehicle width direction.

The first divided portion 91 includes an inner arc portion 91a that is the inside portion of the annular portion 85 in the vehicle width direction, a front extension portion 91b extending forward from the front end portion of the inner arc portion 91a, and a rear extension portion 91c extending rearward from the rear end portion of the inner arc portion 91a.

The second divided portion 92 includes an outer arc portion 92a that is the outside portion of the annular portion 85 in the vehicle width direction, a front extension portion 92b extending forward from the front end portion of the outer arc portion 92a, and a rear extension portion 92c extending rearward from the rear end portion of the outer arc portion 92a.

The front extension portion 92b overlies the front extension portion 91b from the outside in the vehicle width direction, forming the front fixing portion 86.

The rear extension portion 92c overlies the front extension portion 92b from the outside in the vehicle width direction, forming the rear fixing portion 87.

The hole portion 88 of the front fixing portion 86 and the rear fixing portion 87 includes a bolt hole 88a into which the bolt 62 is inserted from the outside in the vehicle width direction and a fitting hole 88b into which the shaft-shaped portion 68 of the inner fixing member 61 is inserted from the inside in the vehicle width direction. The fitting hole 88b has a larger diameter than the bolt hole 88a.

The fitting holes 88b are formed in the inner face of the front fixing portion 86 in the vehicle width direction and the inner face of the rear fixing portion 87 in the vehicle width direction. In other words, the fitting holes 88b are formed in the first divided portion 91.

Figure 8:
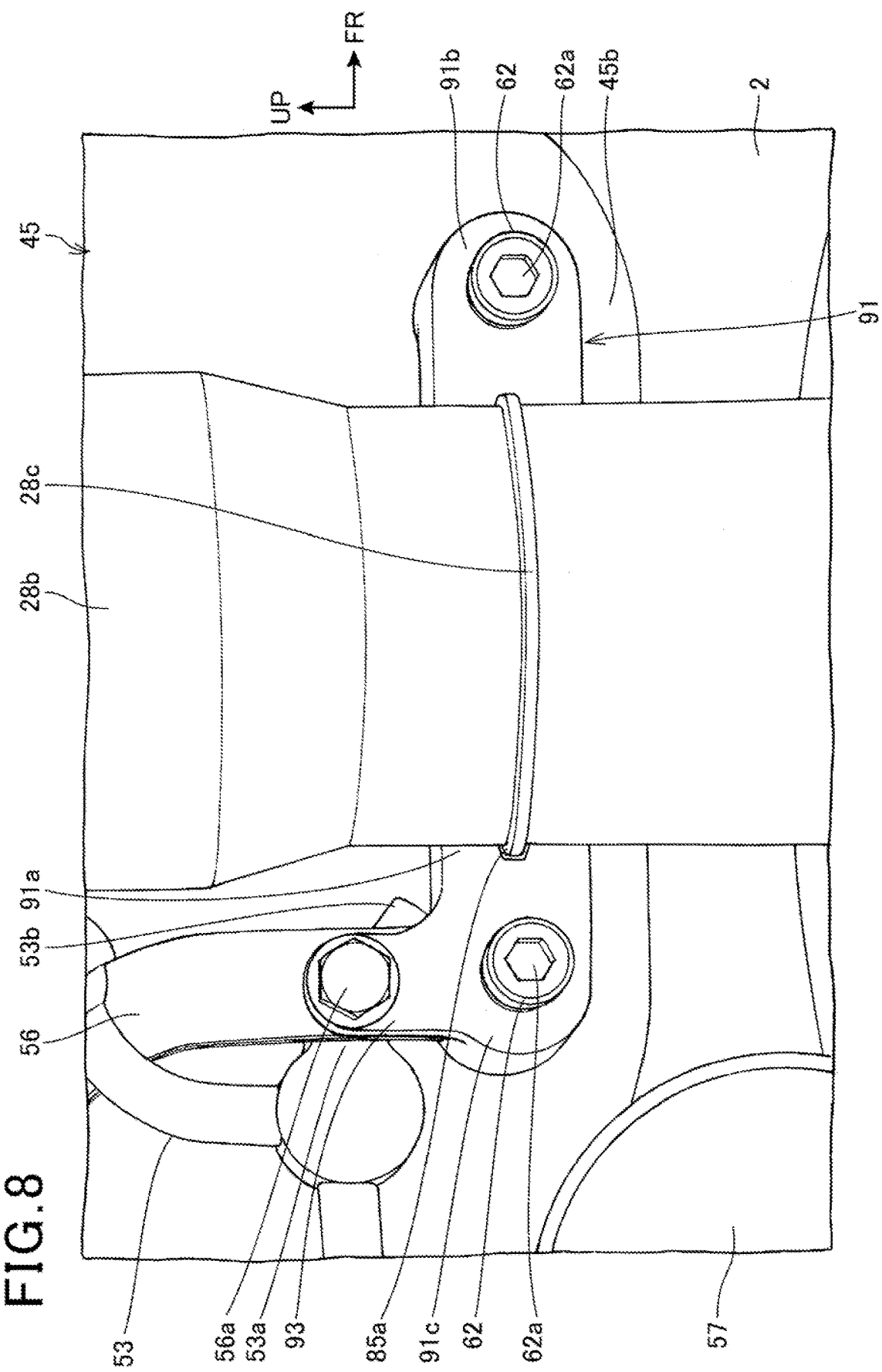
FIG. 8 is a side view of the structure for attaching the front fender.

FIG. 8 is a side view of the structure for attaching the front fender 45. In FIG. 8, the second divided portion 92 is not illustrated.

With reference to FIGS. 6 and 8, the outer periphery of an upper portion of the movable tube 28b has a protrusion 28c protruding outward in the radial direction of the movable tube 28b. The protrusion 28c is formed to be an annular shape that goes around the outer periphery of the movable tube 28b.

The inner peripheral portion of the annular portion 85 of the fender stay 55 has a recess 85a recessed outward in the radial direction of the annular portion 85. The recess 85a is an annular shape that goes around the inner peripheral portion of the annular portion 85 and is formed in the first divided portion 91 and the second divided portion 92.

The fender stay 55 is positioned in the axial direction of the movable tube 28b by the recess 85a engaging with the protrusion 28c of the movable tube 28b.

The fender stay 55 is positioned relative to the front fender 45 by the front and rear fitting holes 88b respectively fitting to the front and rear shaft-shaped portions 68 of the inner fixing members 61. The fender stay 55 is connected to the front fender 45 by the bolts 62 being inserted from the outside in the vehicle width direction into the front and rear hole portions 88 and fastened to the female threaded portions 70 of the inner fixing members 61.

The fender side-face portion 45b of the front fender 45 is held between the fender fastening portion 64 of the bracket 60 and the fender stay 55 on the shaft-shaped portions 68 of the inner fixing members 61 by the fastening force between the bolts 62 and the inner fixing members 61. The fender stay 55 is in contact with the outside surface of the fender side-face portion 45b at the front fixing portion 86 and the rear fixing portion 87.

The front fixing portion 86 and the rear fixing portion 87 of the fender stay 55 are provided on both sides of the movable tube 28b in a pair in the front-rear direction. The first divided portion 91 of the fender stay 55 has a material reduction recess 89 between the front fixing portion 86 and the rear fixing portion 87, the material reduction recess 89 being away from the fender side-face portion 45b outward in the vehicle width direction.

Figure 9:
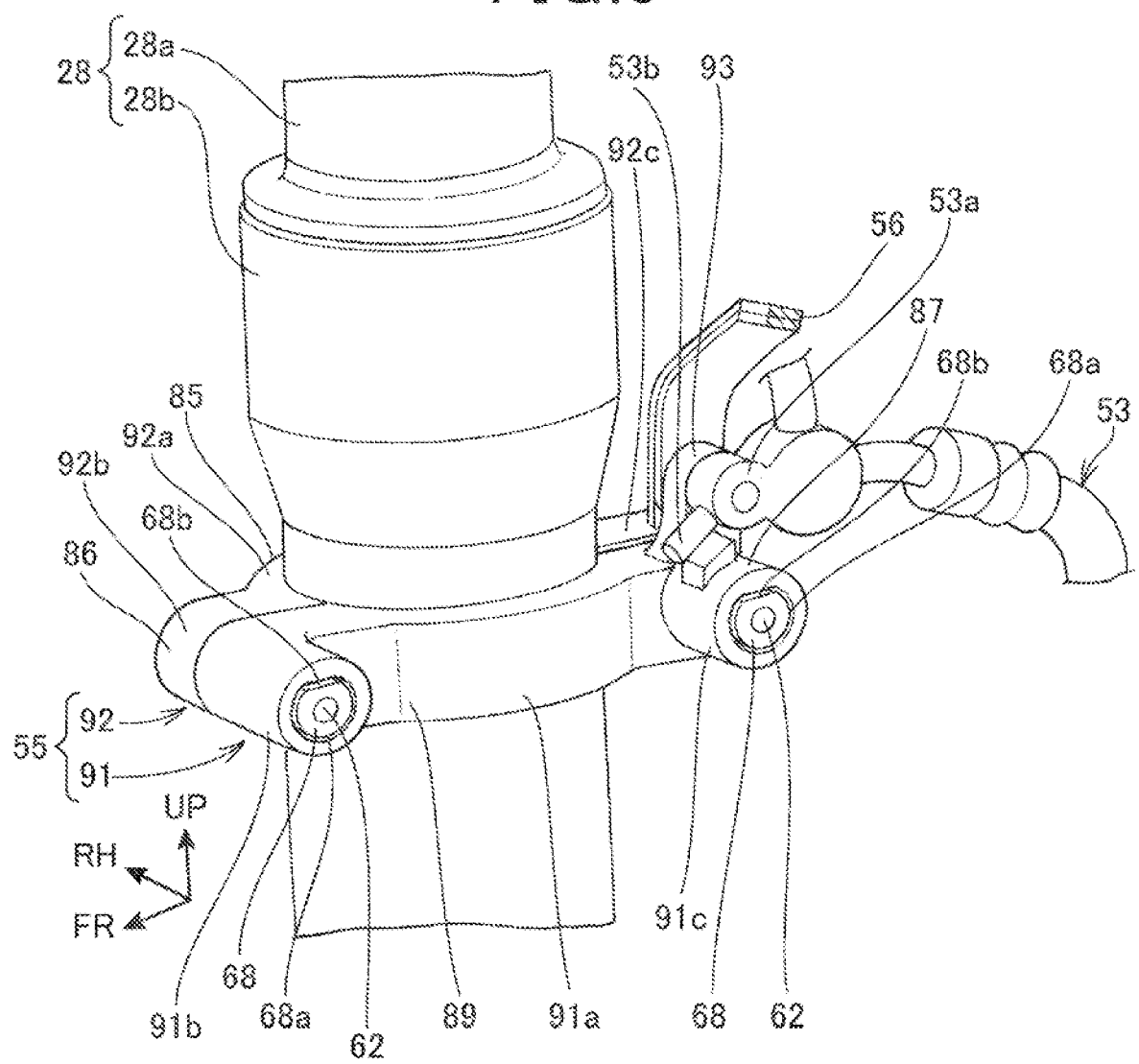
FIG. 9 is a cross-sectional view of a right fender stay, seen from the front fender side.

FIG. 9 is a cross-sectional view of the right fender stay 55, seen from the front fender 45 side.

With reference to FIGS. 2, 8, and 9, the first divided portion 91 of the right fender stay 55 includes a stay attachment portion 93 extending upward from the rear extension portion 91c.

Fixed to the outside face of the stay attachment portion 93 in the vehicle width direction is a stay 56. The stay 56 is fastened to the stay attachment portion 93 with a stay fixing bolt 56a inserted into the stay 56 from the outside in the vehicle width direction. The stay 56 supports, for example, harnesses, pipes, cables, or the like.

The brake pipe 53 includes a fastening portion 53a fixed to the inner face of the stay attachment portion 93 in the vehicle width direction. Above the rear extension portion 91c, the fastening portion 53a is fastened together with the stay 56 to the stay attachment portion 93 with the stay fixing bolt 56a. In other words, the stay attachment portion 93 is a pipe fixing portion to which the brake pipe 53 is fixed.

The brake pipe 53 includes a rod-shaped rotation restriction portion 53b extending forward and downward from the fastening portion 53a. The rotation restriction portion 53b comes into contact with the rear extension portion 91c from above.

The rotation of the fastening portion 53a in fastening the stay fixing bolt 56a is restricted by the rotation restriction portion 53b coming into contact with the rear extension portion 91c.

Here, with reference to FIGS. 3 to 6, an example of a procedure of attaching the front fender 45 to the fork tubes 28 will be described.

Attachment of the front fender 45 is performed in a state in which the front wheel 2 is attached between the right and left fork tubes 28 via the axle 2a.

First, the bracket 60 is set in the inner face (the back face) of the front fender 45, and then the inner fixing members 61 are inserted from the inside of the front fender 45 into the attachment holes 64a of the fender fastening portions 64 and the fixation holes 45c of the front fender 45. The inner fixing members 61 are inserted at the two positions of the left fender fastening portion 64 and the two positions of the right fender fastening portion 64. In this state, the inner fixing member 61 is prevented from coming out by the flange portion 69, and the shaft-shaped portion 68 protrudes from the fender side-face portion 45b outward in the vehicle width direction. With this configuration, the inner fixing member 61 is caught at the fixation hole 45c via the shaft-shaped portions 68 and is less likely to fall off the fixation hole 45c. Thus, it is possible to prevent the inner fixing members 61 from falling off in the attachment work for the front fender 45, making the attachment work easy.

Then, the first divided portions 91 are attached to the fender side-face portions 45b via the front and rear inner fixing members 61. In this state, the fitting holes 88b of the first divided portions 91 are fitted to the shaft-shaped portions 68 of the inner fixing members 61. Thus, the first divided portions 91 can be positioned at appropriate positions relative to the front fender 45.

Next, the front fender 45 with the first divided portions 91 attached is placed between the right and left movable tubes 28b. The first divided portions 91 are temporarily assembled to the movable tubes 28b via the inner arc portions 91a. In this state, since the recesses 85a of the inner arc portions 91a engage with the protrusions 28c of the movable tubes 28b, it possible to position the first divided portions 91 at appropriate positions.

After that, the second divided portions 92 are assembled to the first divided portions 91 and the movable tubes 28b from the outside in the vehicle width direction, and the bolts 62 are inserted into the fender stays 55 from the outside in the vehicle width direction and fastened to the inner fixing members 61. With this process, the fender side-face portions 45b are held between the fender fastening portions 64 of the bracket 60 and the fender stays 55 on the shaft-shaped portions 68 of the inner fixing members 61 by the fastening force between the bolts 62 and the inner fixing members 61. The first divided portions 91 and the second divided portions 92 are fastened with the bolts 62, and thus, the movable tubes 28b are held between the first divided portions 91 and the second divided portions 92.

The bolt 62 is fastened by inserting a tool into the head 62a of the bolt 62 and rotating the bolt 62 with the tool. Since the head 62a of the bolt 62 is located on the outside face of the fender stay 55 in the vehicle width direction, it is easy to access the head 62a from the outside of the front fender 45 to fasten the bolt 62. This makes it possible to attach the front fender 45 to the fork tubes 28 without removing the front wheel 2 from the fork tubes 28.

For example, in a configuration in which a front fender is fixed to fork tubes with bolts that are inserted into the front fender from the inside of the front fender, the front wheel needs to be removed from the fork tubes in order to make a space for rotating the bolts with a tool. In this case, the motorcycle 1 needs to be jacked up, making the work more difficult.

In addition, the inner fixing member 61 engages with the irregular-shaped attachment hole 64a of the bracket 60, and this prevents the inner fixing member 61 from rotating. Thus, it is possible to prevent the inner fixing member 61 from being rotated together in rotating and fastening the bolt 62, and it is easy to fasten the bolt 62.

The inner fixing member 61 is not welded to either the bracket 60 or the front fender 45 and is fastened with the bolt 62 in a state of being fitted into the bracket 60 and the front fender 45. Thus, force such as the torsional force that acts on the front fender 45 while the motorcycle 1 is traveling is not concentrated at the weld portions of the front fender 45, and it is possible to mitigate the stress concentration at the attachment portions of the front fender 45.

In addition, since there is no weld portion in the attachment portion of the front fender 45, the work to remove welding marks can be eliminated.

In addition, since there is no weld portion in the attachment portion of the front fender 45, the degree of freedom in the shape of the front fender 45 is high, and the decorative appearance can be improved. In addition, since the front fender 45 only needs to include the fixation holes 45c into which the inner fixing members 61 are inserted, the shape of the front fender 45 can be simple. Hence, it is easy for the user of the motorcycle 1, for example, to replace the front fender 45 with another general front fender and attach it.

Further, since the fender stay 55 only needs to include the hole portions 88 for the bolts 62, the fender stay 55 does not need to include a threaded portion or the like for attaching the front fender 45, and it is possible to simplify the shape of the fender stay 55.

As has been described above, the motorcycle 1 according to the embodiment to which the present invention is applied includes: a pair of right and left fork tubes 28; a front wheel 2 disposed between the right and left fork tubes 28 and supported by the fork tubes 28; a front fender 45 fixed to the fork tubes 28 and covering the front wheel 2 from above; a bracket 60 supporting the front fender 45 from an inside of the front fender 45; and a bolt 62 that fastens the front fender 45 to the fork tubes 28, the motorcycle 1 further includes: a fender stay 55 provided at the fork tubes 28; and an inner fixing member 61 having a shaft shape and inserted into the bracket 60 and the front fender 45 from the inside of the front fender 45, the inner fixing member 61 is fastened to the bolt 62 inserted into the fender stay 55 from an outside in a vehicle width direction, and the front fender 45 is held between the fender stay 55 and the bracket 60 on an axis of the inner fixing member 61 by fastening force of the bolt 62.

With this configuration, since the front fender 45 can be fixed by fastening the bolt 62 and the inner fixing member 61, it is possible to attach the front fender 45 to the fork tubes 28 without welding on the front fender 45. Since the front fender 45 can be fixed with the bolt 62 that is inserted from the outside in the vehicle width direction, it is unlikely that the front wheel 2 needs to be removed, and it is easy to attach the front fender 45.

The inner fixing member 61 includes a shaft-shaped portion 68 that is inserted into the bracket 60 and the front fender 45 from the inside of the front fender 45, and a flange portion 69 that is in contact with the bracket 60 from an inside in the vehicle width direction and prevents the inner fixing member 61 from coming out.

With this configuration, since the inner fixing member 61 is prevented from coming out by the flange portion 69, it is possible to hold the front fender 45 between the fender stay 55 and the bracket 60 by the fastening force of the bolt 62. Since the inner fixing member 61 can be positioned at an appropriate position with the flange portion 69 in attachment work, the attachment work is easy.

The shaft-shaped portion 68 protrudes from the front fender 45 outward in the vehicle width direction, and an inner periphery of the shaft-shaped portion 68 has a female threaded portion 70 to which the bolt 62 is fastened, the fender stay 55 includes a hole portion 88 into which the bolt 62 is inserted from the outside in the vehicle width direction, and the shaft-shaped portion 68 is fitted into the hole portion 88.

With this configuration, since the shaft-shaped portion 68 of the inner fixing member 61 protrudes from the front fender 45 outward in the vehicle width direction, it is possible in attachment work to set the inner fixing member 61 in a state in which the inner fixing member 61 is inserted into the bracket 60 and the front fender 45. Thus, it is possible to prevent the inner fixing member 61 from falling off the front fender 45 in attachment work, and the workability is favorable.

In addition, since the shaft-shaped portion 68 of the inner fixing member 61 is fitted into the hole portion 88 of the fender stay 55, it is possible to position the fender stay 55 at an appropriate position, and the workability is favorable. Further, since the length of the female threaded portion 70 can be long, it is possible to appropriately fasten the bolt 62 and the inner fixing member 61.

The inner fixing member 61 is inserted into an attachment hole 64a formed in the bracket 60 from the inside in the vehicle width direction and is prevented from rotating relative to the attachment hole 64a.

With this configuration, since the inner fixing member 61 is prevented from rotating relative to the attachment hole 64a, the worker does not have to press the inner fixing member 61 to prevent the rotation of the inner fixing member 61 when the bolt 62 is fastened, and thus, the attachment work is easy.

The attachment hole 64a is an irregular-shaped hole instead of a perfect circle hole, and the inner fixing member 61 is prevented from rotating by engaging with the irregular-shaped hole.

With this configuration, it is possible to prevent the inner fixing member 61 from rotating with a simple structure using an irregular-shaped hole.

The fender stay 55 includes a first divided portion 91 and a second divided portion 92 combined and fastened to each other to form an annular shape that fits to an outer periphery of the fork tubes 28, and the first divided portion 91 and the second divided portion 92 are fastened with the bolt 62.

With this configuration, since the fender stay 55 is divided, it is easy to attach the fender stay 55 to the fork tubes 28. Since the fender stay 55 can be attached by utilizing the bolt 62 for fixing the front fender 45, it is possible to reduce the part count.

The fender stay 55 has an annular shape that fits to an outer periphery of the fork tubes 28, and the fender stay 55 has a recess 85a provided in an inner peripheral portion of the fender stay 55, and the recess 85a engages with the outer periphery of the fork tubes 28.

With this configuration, it is possible to position the fender stay 55 relative to the fork tubes 28 by using the recess 85a of the fender stay 55.

The fender stay 55 is provided at each of the right and left fork tubes 28, and the bracket 60 includes a pair of right and left front fender fastening portions 64 that are respectively fastened to the right and left fender stays 55 and a connecting portion 65 connecting the right and left front fender fastening portions 64 in a right-left direction.

With this configuration, the right and left fender stays 55 are connected via the bracket 60 in the right-left direction, it is possible to support the front fender 45 with a high stiffness by using the right and left fender stays 55 and the bracket 60.

The fender stay 55 includes a pair of front fixing portion 86 and rear fixing portion 87 located on both sides of the fork tubes 28 in the front-rear direction, the front fixing portion 86 and rear fixing portion 87 holding the front fender 45 between the bracket 60 and the fender stay 55, and a material reduction recess 89 away from the front fender 45 outward in the vehicle width direction is formed between the front fixing portion 86 and rear fixing portion 87.

With this configuration, it is possible to reduce the weight of the fender stay 55 by forming the material reduction recess 89.

The fender stay 55 includes a stay attachment portion 93 serving as a pipe fixing portion to which a brake pipe 53 is fixed.

With this configuration, it is possible to fix the brake pipe 53 with a simple structure utilizing the fender stay 55.

The brake pipe 53 includes a rotation restriction portion 53b that comes into contact with the fender stay 55 to restrict rotation of the brake pipe 53.

With this configuration, it is possible to restrict the rotation of the brake pipe 53 with a simple structure.

Note that the above embodiment is for describing an aspect to which the present invention is applied, and thus, the present invention is not limited to the above embodiment.

Although in the description of the fender stay 55 in the above embodiment, the recess 85a provided on the inner peripheral portion of the fender stay 55 engages with the outer periphery of the fork tube 28, the present invention is not limited to this configuration. For example, the fender stay 55 may have a configuration in which the protrusion is provided on the inner peripheral portion of the fender stay 55, and the protrusion engages with the outer periphery of the fork tube 28.

Although the above embodiment has been described based on an example of the motorcycle 1, the present invention is not limited to this example, but the present invention is applicable to a three-wheeled vehicle with two front wheels or two rear wheels and a saddle-ride type vehicle with four or more wheels.

REFERENCE SIGNS LIST 1 motorcycle (saddle-ride type vehicle)
2 front wheel
28 fork tube
45 front fender (fender)
53 brake pipe
53b rotation restriction portion
55 fender stay
60 bracket
61 inner fixing member
62 bolt
64 fender fastening portion
64a attachment hole (irregular-shaped hole)
65 connecting portion
68 shaft-shaped portion
69 flange portion
70 female threaded portion
85a recess
86 front fixing portion (fixing portion)
87 rear fixing portion (fixing portion)
88 hole portion
89 material reduction recess
91 first divided portion
92 second divided portion
93 stay attachment portion (pipe fixing portion)

The invention claimed is:

1. A saddle-ride type vehicle comprising:
a pair of right and left fork tubes; a front wheel disposed between the right and left fork tubes and supported by the fork tubes; a fender fixed to the fork tubes and covering the front wheel from above; a bracket supporting the fender from an inside of the fender; and a bolt that fastens the fender to the fork tubes,
the saddle-ride type vehicle further comprising: a fender stay provided at the fork tubes; and an inner fixing member having a shaft shape and inserted into the bracket and the fender from the inside of the fender, wherein
the inner fixing member is fastened to the bolt inserted into the fender stay from an outside in a vehicle width direction,
the fender is held between the fender stay and the bracket on an axis of the inner fixing member by fastening force of the bolt,
the inner fixing member includes a shaft-shaped portion that is inserted into the bracket and the fender from the inside of the fender, and a flange portion that is in contact with the bracket from an inside in the vehicle width direction and prevents the inner fixing member from coming out,
the inner fixing member is inserted into an attachment hole formed in the bracket from the inside in the vehicle width direction, the attachment hole is an irregular-shaped hole instead of a perfect circle hole, and the inner fixing member is not welded to the bracket and is prevented from rotating by the shaft-shaped portion engaging with the irregular-shaped hole,
an inner periphery of the shaft-shaped portion has a female threaded portion to which the bolt is fastened,
the fender stay includes a hole portion into which the bolt is inserted from the outside in the vehicle width direction, and
the shaft-shaped portion protrudes from the fender outward in the vehicle width direction and is fitted into the hole portion.

2. The saddle-ride type vehicle according to claim 1, wherein
the fender stay includes a first divided portion and a second divided portion combined and fastened to each other to form an annular shape that fits to an outer periphery of the fork tubes, and
the first divided portion and the second divided portion are fastened with the bolt.

3. The saddle-ride type vehicle according to claim 1, wherein
the fender stay has an annular shape that fits to an outer periphery of the fork tubes, and
the fender stay has a recess or a protrusion provided in an inner peripheral portion of the fender stay, and the recess or the protrusion engages with the outer periphery of the fork tubes.

4. The saddle-ride type vehicle according to claim 1, wherein
the fender stay is provided at each of the right and left fork tubes, and
the bracket includes a pair of right and left fender fastening portions that are respectively fastened to the right and left fender stays and a connecting portion connecting the right and left fender fastening portions in a right-left direction.

5. The saddle-ride type vehicle according to claim 1, wherein
the fender stay includes a pair of front and rear fixing portions on both sides of the fork tubes, the fixing portions holding the fender between the bracket and the fender stay, and
a material reduction recess away from the fender outward in the vehicle width direction is formed between the front and rear fixing portions.

6. The saddle-ride type vehicle according to claim 1, wherein
the fender stay includes a pipe fixing portion to which a brake pipe is fixed.

7. The saddle-ride type vehicle according to claim 6, wherein
the brake pipe includes a rotation restriction portion that comes into contact with the fender stay to restrict rotation of the brake pipe.

8. The saddle-ride type vehicle according to claim 2, wherein
the hole portion includes a bolt hole into which the bolt is inserted and a fitting hole into which the shaft-shaped portion is inserted, and
the fitting hole is provided in the first divided portion disposed on an inside of the second divided portion in the vehicle width direction.

9. The saddle-ride type vehicle according to claim 8, wherein
the first divided portion has a recess or a protrusion provided in an inner peripheral portion of the first divided portion, and the recess or the protrusion engages with the outer periphery of the fork tubes.

* * * * *